Aug. 11, 1931. T. ROBINSON 1,818,009
METHOD OF MAKING ROOFING PRODUCTS
Filed June 14, 1929
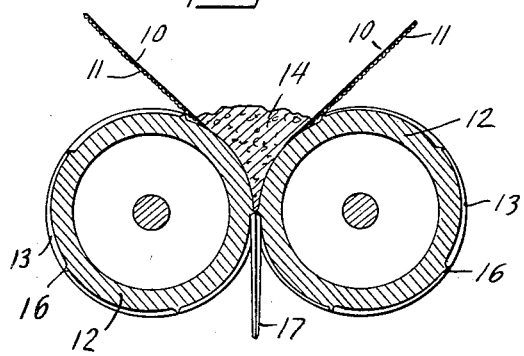
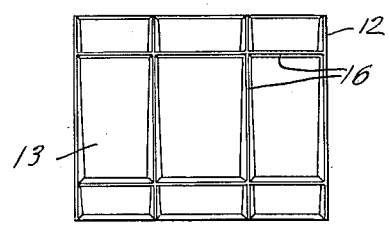
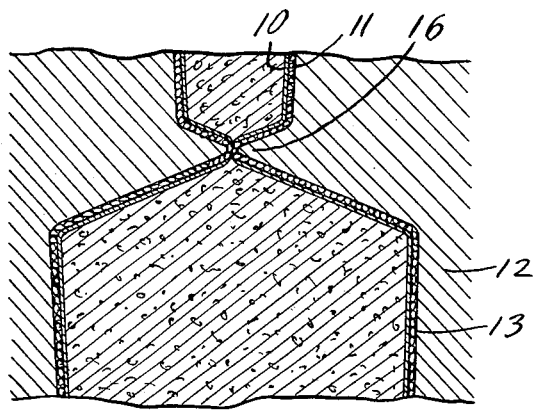
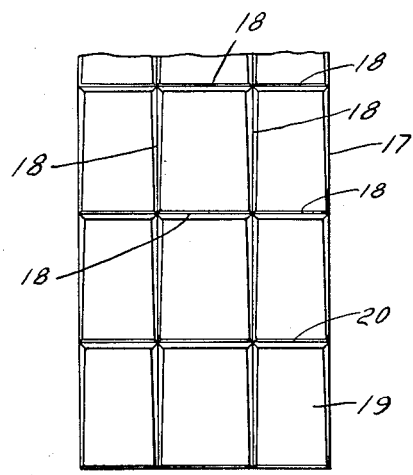
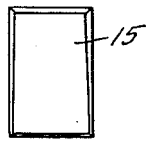
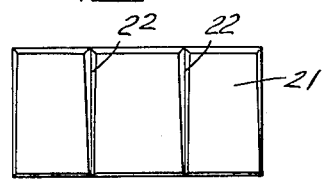
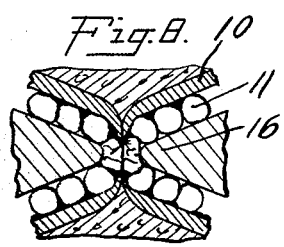
INVENTOR
Thomas Robinson
BY
ATTORNEYS Patented Aug. 11, 1931

1,818,009

UNITED STATES PATENT OFFICE

THOMAS ROBINSON, OF NEW YORK, N. Y., ASSIGNOR TO LANCASTER ASPHALT, INC., OF NEW YORK, N. Y., A CORPORATION OF DELAWARE

METHOD OF MAKING ROOFING PRODUCTS

Application filed June 14, 1929. Serial No. 370,973.

This invention relates to the manufacture of roofing elements, and is concerned more particularly with a method of making roofing elements consisting primarily of plastic material and surfaced with granules of crushed slate or other similar grit. The method of the invention may be advantageously used in the manufacture of roofing elements of the type described and claimed in my Patent No. 1,689,242 of January 8, 1929 and when so used, the method is an improvement on that set forth and described in my co-pending application Serial No. 219,010, filed September 12, 1927. An adaptation of the invention suitable for use in connection with the manufacture of my patented roofing elements will accordingly be described in detail for purposes of illustration.

The roofing elements or shingles of my patent consists of a body of hardened plastic material protected by a pair of jacket sheets, these jacket sheets covering opposite faces of the body and meeting without substantial overlap along at least a pair of opposite edges of the body. These elements may conveniently be made by the method of the prior application, according to which plastic material to form the body is placed between a pair of webs of jacket material and the webs and plastic material advanced through a pair of molding drums which are provided with cooperating mold cavities. In the rotation of these drums, the cooperating cavities thereon compress and shape the jacketed mass to produce a succession of individual shingles. As disclosed in the prior application, the drums are formed by knife edges extending throughout a part or all of the outline of the cavities so that during the operation of the drums the co-action of the knife edges severs the jacket material either along the entire outline of each individual unit or along a part of that outline. The jacket sheets employed consist of a light felt which is saturated and coated with asphalt and then covered with grit surfacing material on one face, which is to form the outer face of the finished product and this combination of felt, grit, and asphalt in the jacket sheets makes the material extremely difficult to cut. I have found that when the molding drums are provided with knife edges which sever the felt on the outlines of the individual units, the knife edges rapidly become dull so that they must be removed, sharpened, and replaced.

In order to overcome the difficulties involved in the production of shingles consisting primarily of plastic material and having a grit surfacing, such as the shingles above referred to, I have devised a new method of producing the units in connected succession and destroying or weakening the connection between adjacent units; the new method reducing the wear on the equipment and giving the shingles so produced slight irregularities in outline which tend to destroy the monotonous appearance which shingles of uniform shape impart to the roof covered with them.

According to the new method, the shingles consisting primarily of plastic material and having a grit surfacing are formed in continuous succession by molding operations and then the grit is forced inwardly by suitable knives or the like along boundaries of the elements to weaken or destroy the connection. In making my patented shingles, the grit surfaced felt and plastic material are advanced through molding drums which shape and mold the jacketed mass into the desired units, these molding drums being provided with knife edges along all or a part of the outlines of the mold cavities in their surfaces. The knife edges are so formed that as the drums rotate, cooperating knife edges on the two drums do not come into contact and consequently do not actually sever the felt. The edges, however, act on the grit with which each piece of felt is coated and force the grit particles into the felt along the outlines of the individual units, the particles thus tearing or weakening the felt, and in effect cutting it. The felt sheets with the plastic material between them come from between the molding drums in a continuous web weakened along the outlines of the individual units of which the web is made up so that these units may be readily separated from the web by bending the latter along the weakened lines. Since the sheets are not severed cleanly but simply weakened by the tearing action of the grit and the individual units are then separated from the web by the bending operation described, the individual units usually have an irregular edge outline so that the units are not exactly uniform in shape and thus when laid on a roof are not monotonous.

For a better understanding of the invention, reference may be had to the accompanying drawings, in which Fig. 1 is an end view partly in section illustrating conventionally the apparatus used in producing the units;

Fig. 2 is a face view of one of the molding drums;

Fig. 3 is an enlarged sectional view showing the operation of the cutting edges on the drums;

Fig. 4 is a plan view of a portion of the web discharged from the drums;

Fig. 5 is a plan view of a transverse section of this web;

Fig. 6 is a plan view of a single unit removed from the section of the web shown in Fig. 5;

Fig. 7 is a side view of the individual unit shown in Fig. 6; and

Fig. 8 is a view similar to Fig. 3 but on an enlarged scale.

In the manufacture of the units, the jacket sheets 10 are preferably made of a very light weight felt of the type commonly used for roofing purposes. This felt is much lighter than would be used for ordinary roofing and it is saturated with asphalt and given an asphalt coating on one face in the ordinary manner. On the coated face of the felt is applied a layer of grit surfacing material 11. This grit may be crushed slate or similar material of that sort ordinarily used for the purpose. The grit used includes particles, the thickness of which is comparable to or greater than the thickness of the felt, these particles being embedded in the asphalt coating and bound to the felt thereby.

The two felt webs are advanced to a pair of molding drums 12 which are provided with mold cavities 13 in their surfaces and in the space between the webs just above the drums there is maintained a quantity of plastic material 14 which consists of an aggregate and a binder, such, for example, as ground cork, cinders, asbestos fibre, and the like, mixed with asphalt. The mold cavities on the drums are formed so that in the rotation of the drums a pair of cavities cooperate to compress and mold portions of the sheets with plastic material between them to the form of individual shingles 15 preferably tapering in thickness from one end to the other, though the units may be made in any desired shape by proper formation of the drums. Preferably, the drums are provided with a plurality of cavities arranged in rows axially of the drums and each drum (Fig. 2) has three such cavities in a row extending lengthwise of the drum, and there are a plurality of rows circumferentially of the drum.

Each of the molding cavities on the drums is defined wholly or in part by knife edges 16. These edges come close together into cooperating relation as the drums rotate, but the edges do not meet. As shown more clearly in Fig. 8, the particles 11 of the grit surfacing have such a size compared to the thickness of the felt 10 to which they are affixed that the knife edges on the two drums can force the grit particles into the felt to tear or shear the latter, even though these knife edges do no come into contact. As the knife edges move together toward the felt, they first force the particles of grit into the felt to weaken the latter along the outlines of the individual shingles and by a proper setting of the knife edges and a proper selection of the size of the grit particles, the knife edges may crush the particles between them as shown in Fig. 8. It is sufficient for ordinary purposes, however, to set the knives and use grit particles of such a size that the particles are simply forced into the felt by the action of the knives.

As the drums rotate, there is discharged therefrom a web 17 made up of the two jacket sheets with the plastic material between them, this web being shaped into a succession of transverse rows of individual shingles, three shingles in a row. The number of shingles in a row in the web depends on the construction of the molding drums and by using wider felt and properly constructing the drums more or less individual units may be made simultaneously. The web 17 is weakened along the outlines 18 of the individual units by the action of the knife edges 16, and as the web advances, the workman takes hold of the end section 19 consisting of three units side by side and bends the web back and forth along the weakened transverse line 20 to remove the free unit section 21. Thereafter, this section is bent back and forth along the lines 22, 22 to separate individual units 15.

The weakening of the jacket sheets along the outlines of the individual units by the action of the knife edges 16 forcing the grit particles into the felt makes it possible to separate the units with great facility, and since the felt is weakened by the action of the grit particles rather than being severed by knife edges, the edges of the individual units are not clean cut but are likely to be somewhat irregular. This irregularity improves the appearance of the individual units, as the irregularities are sufficient to relieve the monotony in a roof laid with these shingles to a substantial degree. Since the knife edges do not perform a severing action on the felt but simply bring about the weakening of the felt, it is not necessary that the edges should be sharp and the edges do not wear rapidly since they perform more of a crushing than a cutting action. The production of the individual units by the new method is, therefore, carried on at a reduced cost by reason of the less wear on the equipment and the units produced by this method are of improved appearance.

While I have described my invention in detail in connection with the manufacture of the roofing elements disclosed in my patent above identified, I do not desire to be limited to that particular adaptation of the invention, and intend to claim such other applications of my new method as come within the scope of the appended claims.

What I claim is:

1. A method of making roofing elements which comprises placing plastic material between a pair of jacket sheets having a grit surfacing, pressing and molding the jacketed mass to a selected shape, and weakening the sheets along boundaries of the shape by forcing the grit substantially into the sheets along said boundaries.

2. A method of making roofing elements which comprises introducing plastic material in soft condition between a pair of jacket sheets having a grit surfacing and in contact with the unsurfaced faces thereof, pressing and molding the jacketed mass to a selected shape, and forcing the grit into the sheets along at least a pair of opposite edges of the outline of the shape to weaken the sheets.

3. A method of making roofing elements which comprises advancing a pair of grit surfaced jacket sheets in spaced relation, introducing plastic material into the space between the sheets, pressing and molding the jacketed mass to form a succession of units of selected shape and forcing the grit into the sheets along the boundaries of said shape to weaken the sheets and permit ready separation of the units from the sheets.

4. A method of making roofing elements which comprises advancing in spaced relation a pair of jacket sheets each having a layer of grit surfacing on one face thereof, certain of the particles of grit having a thickness at least as great as the thickness of the individual sheets, placing plastic material between the sheets and in contact with the faces of the sheets not covered with the grit, pressing and molding the jacketed mass to a selected shape, and forcing the grit particles into the sheets along the outline of said shape to weaken the sheets.

5. A method of making roofing elements which comprises advancing a pair of sheets endwise, each of said sheets having grit surfacing on one face thereof placing plastic material between the sheets in contact with the uncoated faces thereof, pressing and molding the jacketed mass to a selected shape, and forcing the grit particles into the sheets along at least a pair of opposite edges of said shape.

6. A method of making roofing elements which comprises placing plastic material between a pair of jacket sheets having grit surfaces, pressing and molding the jacketed mass to form a web made up of a plurality of shingle units and simultaneously weakening the web along at least a pair of opposite edges of each of said units by forcing the grit into the sheets of the web along said edges, and separating the individual units from the web along the weakened lines.

7. In a method of making roofing elements containing plastic material and having a grit surfacing, the steps of applying molding pressure to the material to form a succession of connected elements, and forcing the grit into the body of the elements along boundaries of individual elements to weaken the connection, whereby ready separation of the elements is permitted.

8. In a method of making roofing elements, the major portion of which is made up of a plastic material, said elements having a grit surfacing, the steps of producing a succession of connected elements by molding operations, and forcing the grit into the body of the elements along boundaries of individual elements to weaken the connection, whereby ready separation of the elements is permitted.

In testimony whereof I affix my signature.

THOMAS ROBINSON.